(12) United States Patent
Ohno et al.

(10) Patent No.: US 10,821,916 B2
(45) Date of Patent: Nov. 3, 2020

(54) AUTOMOBILE INTERIOR COMPONENT

(71) Applicant: KASAI KOGYO CO., LTD., Kanagawa (JP)

(72) Inventors: Tatsushi Ohno, Kanagawa (JP); Nobuaki Seki, Atsugi (JP); Yuki Kumazawa, Ebina (JP)

(73) Assignee: KASAI KOGYO CO., LTD., Kanagawa (JP)

( * ) Notice: Subject to any disclaimer, the term of this patent is extended or adjusted under 35 U.S.C. 154(b) by 0 days.

(21) Appl. No.: 16/345,646

(22) PCT Filed: Feb. 1, 2017

(86) PCT No.: PCT/JP2017/003676
§ 371 (c)(1),
(2) Date: Apr. 26, 2019

(87) PCT Pub. No.: WO2018/142522
PCT Pub. Date: Aug. 9, 2018

(65) Prior Publication Data
US 2019/0270415 A1  Sep. 5, 2019

(51) Int. Cl.
*B32B 3/04* (2006.01)
*B60R 13/02* (2006.01)
*B32B 27/08* (2006.01)

(52) U.S. Cl.
CPC ............ *B60R 13/0243* (2013.01); *B32B 3/04* (2013.01); *B32B 27/08* (2013.01); *B60R 13/02* (2013.01);
(Continued)

(58) Field of Classification Search
CPC ... Y10T 428/24215; Y10T 428/24231–24248; B32B 3/04;
(Continued)

(56) References Cited

U.S. PATENT DOCUMENTS

| 2007/0042157 A1* | 2/2007 | Dooley | B29C 53/36 428/124 |
| 2015/0099089 A1* | 4/2015 | Yamamoto | B60R 13/011 428/81 |

FOREIGN PATENT DOCUMENTS

| JP | S57-161579 U1 | 10/1982 |
| JP | H06-055558 A | 3/1994 |

(Continued)

OTHER PUBLICATIONS

International Search Report for International Application No. PCT/JP2017/003676 dated Mar. 7, 2017, Japan, 1 page.
(Continued)

*Primary Examiner* — Alexander S Thomas
(74) *Attorney, Agent, or Firm* — United IP Counselors, LLC (57) ABSTRACT

An automotive interior component includes a base member including a front surface, a back surface, and a side surface provided between the front surface and the back surface; and a skin material integrated with the base member. The skin material is integrated with the front surface and the side surface. The side surface of the base member is continuous to the front surface of the base member while forming an acute angle of angle α therewith. The skin material includes an end surface extending along the side surface of the base member. The present invention provides the automotive interior component with a neat appearance.

8 Claims, 9 Drawing Sheets

(52) U.S. Cl.
CPC . *B32B 2605/003* (2013.01); *Y10T 428/24215* (2015.01); *Y10T 428/24231* (2015.01); *Y10T 428/24248* (2015.01)

(58) Field of Classification Search
CPC .............. B32B 27/08; B32B 2605/003; B60R 13/0243; B60R 13/02
See application file for complete search history.

(56) References Cited

FOREIGN PATENT DOCUMENTS

| | | |
|---|---|---|
| JP | H11-091452 A | 4/1999 |
| JP | 2006-346945 A | 12/2006 |
| JP | 2011-194686 A | 10/2011 |

OTHER PUBLICATIONS

Office Action for corresponding Japanese application No. 2018-565149 dated Jul. 30, 2019, 3 pages.

* cited by examiner

AUTOMOBILE INTERIOR COMPONENT

CROSS-REFERENCE TO RELATED APPLICATIONS

This application is a National Stage Entry application of PCT International Application No. PCT/JP2017/003676, filed on Feb. 1, 2017, the entire contents of which are hereby incorporated by reference.

BACKGROUND

1. Technical Field

The present invention relates to an automotive interior component.

2. Description of the Background

A conventional automotive interior component such as a door trim is formed by: tucking an end of a skin material around a base member from a front surface to a back surface of the base member via a side surface of the base member; and bonding the base member and the skin material to each other with an adhesive.

The automotive interior component formed in this manner incurs costs for the adhesive and labor for the tucking and the bonding.

In an attempt to eliminate such costs, other automotive interior component is formed by: integrally molding a front surface of a base member and a skin material; and cutting an end of the skin material so that an end surface of the skin material becomes flush with a side surface of the base member.

With the automotive interior component formed in this manner, after the cutting the end, the skin material may be separated from the base member or shrink and deform in the direction becoming separated from the base member. That is, its appearance may become poor.

Japanese Unexamined Patent Application Publication No. 6-55558 (hereinafter referred to as "Patent Literature 1") discloses a method of disposing of an end of a skin material of a door trim including: bonding thereby integrating a skin material and a base member with each other with the skin material tucked from a front side to a side surface of a base member; thereafter removing the integrated mold article from a mold; and thereafter cutting a redundant end of the skin material. Here, Patent Literature 1 is susceptible to improvement in preventing separation of the skin material from the base member to maintain the appearance.

BRIEF SUMMARY

The present invention has been made in view of the foregoing problem, and an object thereof is to provide an automotive interior component with a neat appearance.

In order to achieve the object, the present invention is configured as follows.

An automotive interior component includes: (1) a base member including a front surface, a back surface, and a side surface provided between the front surface and the back surface; and a skin material integrated with the base member. The skin material is integrated with the front surface and the side surface. The side surface of the base member is continuous to the front surface of the base member while forming an acute angle of angle $\alpha$ with the front surface of the base member. The skin material includes an end surface extending along the side surface of the base member.

(2) In the configuration according to (1), the skin material includes an end including a tab bent from the side surface of the base member in a direction becoming separated from the side surface of the base member.

(3) In the configuration according to (2), the tab has a dimension with which the tab is hidden behind the skin material without being caught by a line of sight directed from outside to inside relative to the automotive interior component.

(4) In the configuration according to any one of (1) to (3), a thickness t of the automotive interior component and the angle $\alpha$ satisfy a relational expression:

$$\alpha \leq \pi/2 - \tan^{-1}(1/t)$$

(5) The configuration according to any one of (1) to (4) further includes a fillet provided between the front surface and the side surface, the fillet having a radius falling within a range of 2 mm to 5 mm inclusive.

The present invention provides an automotive interior component with a neat appearance.

DETAILED DESCRIPTION

First Embodiment

In the following, with reference to the drawings, a detailed description will be given of a first mode for carrying out the present invention (hereinafter referred to as the first embodiment). Unless otherwise specified, front, rear, right, left, top, and bottom refer to the directions with reference to the vehicle.

Figure 1:
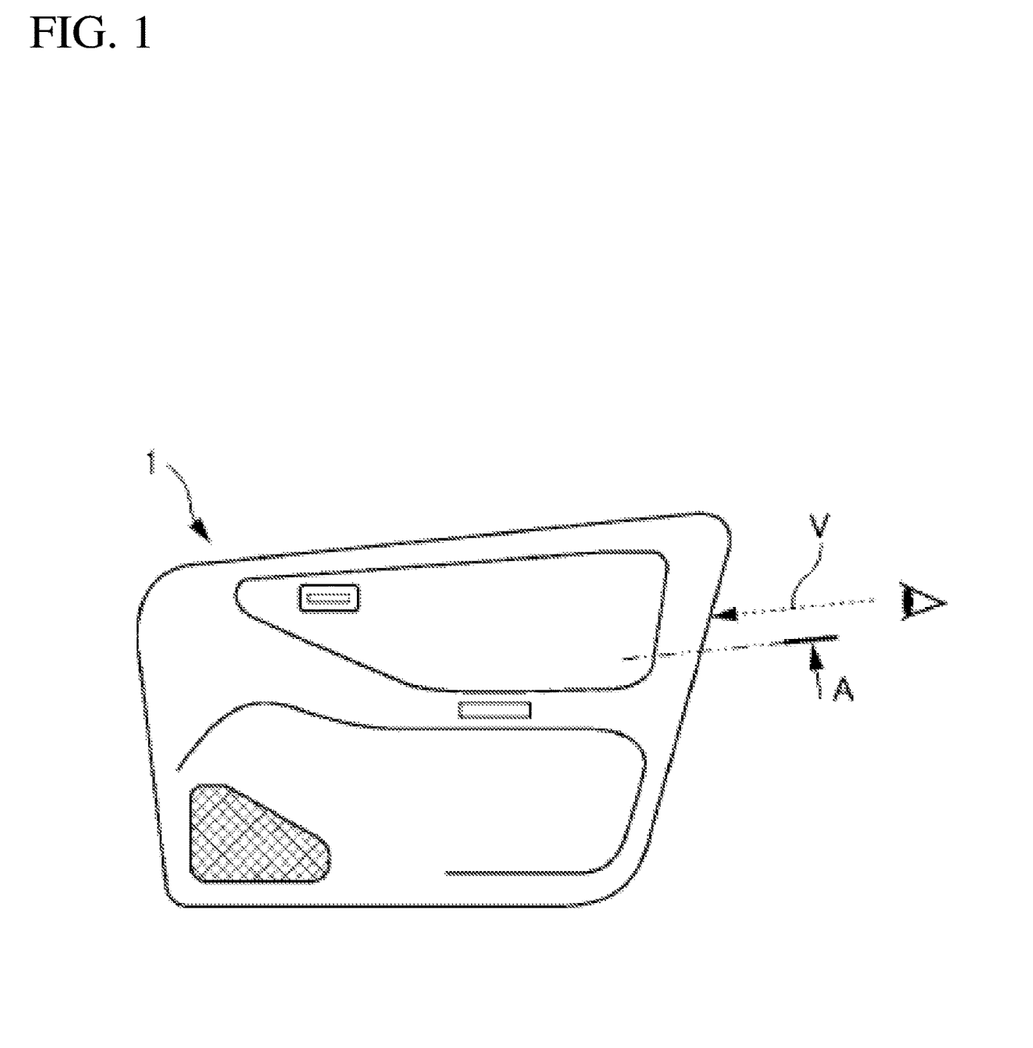
FIG. 1 is a front view of a door trim 1.
Figure 2:
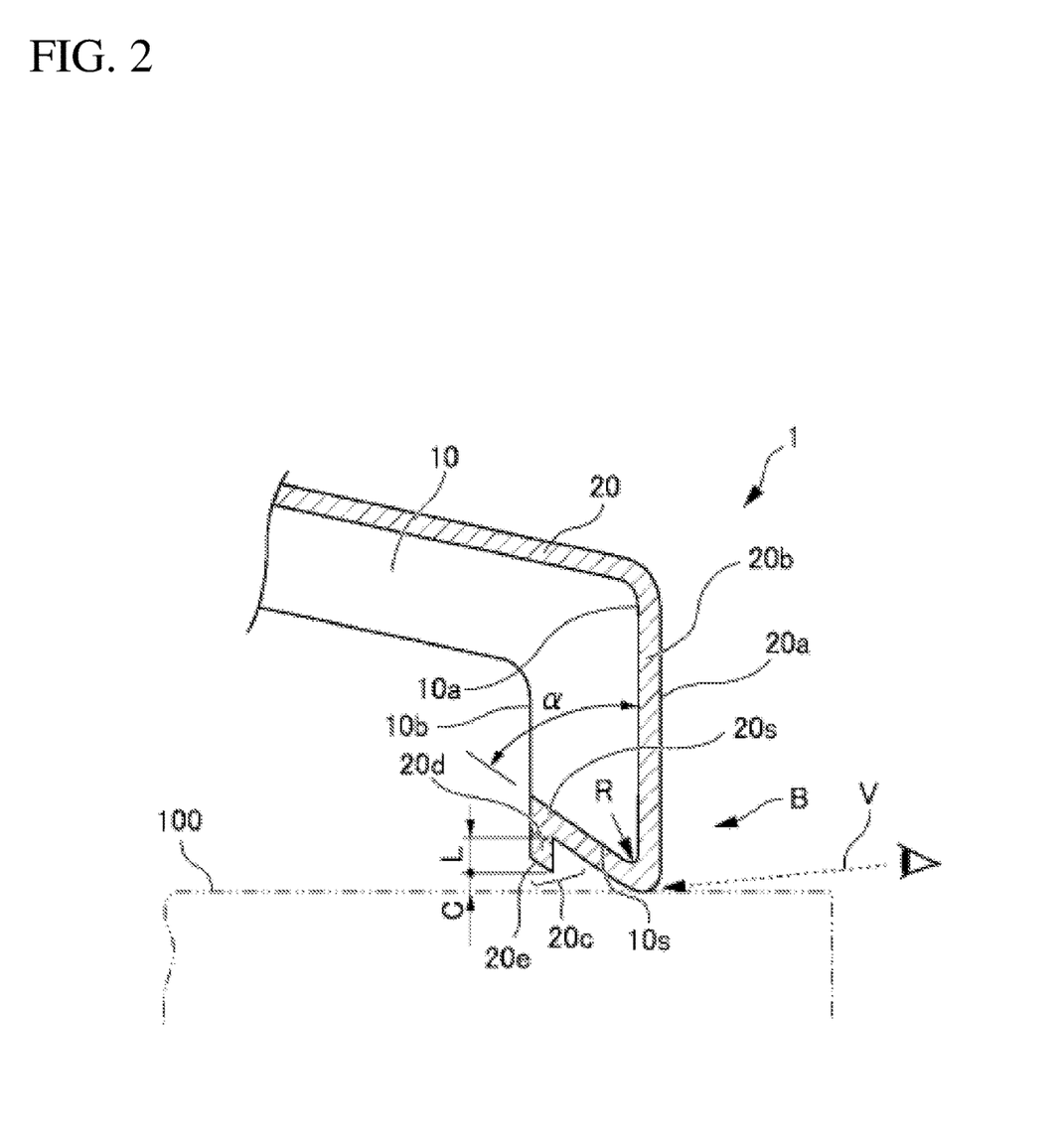
FIG. 2 is a detailed cross-sectional view on arrow A in FIG. 1 according to a first embodiment.

FIG. 1 is a front view of a door trim disposed at a right door of a vehicle. FIG. 2 is a detailed cross-sectional view on arrow A in FIG. 1.

FIG. 1 shows line of sight V directed from the outside to the inside with reference to a door trim 1.

While the following embodiments show the door trim 1 as an exemplarily automotive interior component, the present invention is applicable also to other automotive interior component such as, for example, a rear parcel shelf, a floor trim, a luggage trim, a trunk trim, a rear side trim, a pillar garnish, and a headliner.

As shown in FIGS. 1 and 2, the door trim 1, which is an automotive interior component, is configured to be attached to cover the cabin side of a door panel 100 forming a door. The door trim 1 includes, at its center, an armrest which has its top, bottom, right, and left sides curved toward the door panel 100 and which projects toward the cabin.

As shown in FIG. 2, the door trim 1 includes a base member 10 which includes a front surface 10a, a back surface 10b, and a side surface 10s provided between the front surface 10a and the back surface 10b, and a skin material 20 integrally laminated onto the base member 10 by insert molding.

The base member 10 is configured to be attached to the door panel 100, and provided with a desired stiffness for retaining its shape.

The thickness of the base member 10 preferably falls within a range of 3.0 mm to 6.0 mm inclusive in view of secured stiffness, lightweight, and improved workability.

The material of the base member 10 is thermoplastic resin such as, for example, polyethylene-based resin, polypropylene-based resin, polystyrene-based resin, polyethylene terephthalate-based resin, polyvinyl alcohol-based resin, vinyl chloride-based resin, polyamide-based resin, polyacetal-based resin, polycarbonate-based resin, ionomer-based resin, or ABS resin. The thermoplastic resin is mixed with filler such as reinforcing fibers or reinforcing particles as appropriate, and blended with an additive such as a coloring agent or a fire retardant as appropriate.

The base member 10 is formed by injection molding, and may be solid or foamed.

The base member 10 is formed so that the side surface 10s of the base member 10 is continuous to the front surface 10a of the base member 10 while forming an acute angle of angle α therewith.

Thus, the end surface 20e, which is a section of the skin material 20, is hidden behind the skin material 20 on the line of sight V (see FIG. 2) directed from the outside toward the inside relative to the door trim 1, whereby a neat appearance is presented. This also secures space between the door panel 100 and the door trim 1 for disposing a tab 20d, which will be described later, at an end 20c of the skin material 20.

Between the front surface 10a and the side surface 10s of the base member 10, a fillet (a chamfer) having a radius falling within a range of 2 mm to 5 mm inclusive is provided.

A fillet having a radius less than 2 mm increases the stress at the bent portion of the skin material 20 integrated with the base member 10, increasing the risk of breakage of the skin material 20. On the other hand, a fillet having a radius greater than 5 mm increases the area of the bent portion of the skin material 20, rendering the bent portion noticeable and thus impairing the appearance.

When the skin material 20 is bent closely in contact with the front surface 10a to the side surface 10s of the base member 10 in being formed on the base member 10 by insert molding, the fillet having a radius falling within a range of 2 mm to 5 mm inclusive provided between the front surface 10a and the side surface 10s of the base member 10 prevents concentration of stress to the bent portion of the skin material 20. This minimizes the risk of breakage of the skin material 20.

The material of the skin material 20 may be olefin-based elastomer (TPO), thermoplastic polyurethane (TPU), polyvinyl chloride (PVC) or the like.

The skin material 20 may be a lamination made up of at least two layers, namely, the upper layer and the lower layer. The upper layer may be a thermoplastic resin sheet and the lower layer may be a resin foam such as polyurethane foam, polyethylene foam, or polypropylene foam. The skin material 20 may not be a lamination and may have a single-layer structure.

The front surface of the skin material 20 is provided as appropriate with a decorative part such as grains. The thickness of the skin material 20 can be selected within a range of about 0.3 mm to 4 mm inclusive in accordance with the number of layers in the lamination, required strength and function and the like.

The skin material 20 is laminated on the base member 10 so as to cover the front surface 10a and the side surface 10s of the base member 10 from the front surface 10a to the side surface 10s.

The end 20c of the skin material 20 includes the tab 20d bent from the side surface 10s of the base member 10 in a direction becoming separated from the side surface 10s of the base member 10. Thus, the cross section of the skin material 20 is Z-shaped as shown in FIG. 2.

The tab 20d extends to the end surface 20e by a length dimension L. This increases the stiffness of the end 20c of the skin material 20, and a reverse side 20s of the skin material 20 becomes less prone to be separated from the side surface 10s of the base member 10.

A clearance C is established from the end surface 20e of the tab 20d to the door panel 100. Thus, when the door trim 1 is attached to the door panel 100, the end surface 20e is hidden behind the skin material 20 so as not be caught by the line of sight V directed from the outside to the inside relative to the door trim 1.

The end surface 20e of the skin material 20 is disposed along the side surface 10s of the base member 10. The end surface 20e of the skin material 20 may be parallel to the side surface 10s of the base member 10, and just required to be oriented toward the door panel 100.

Figure 3:
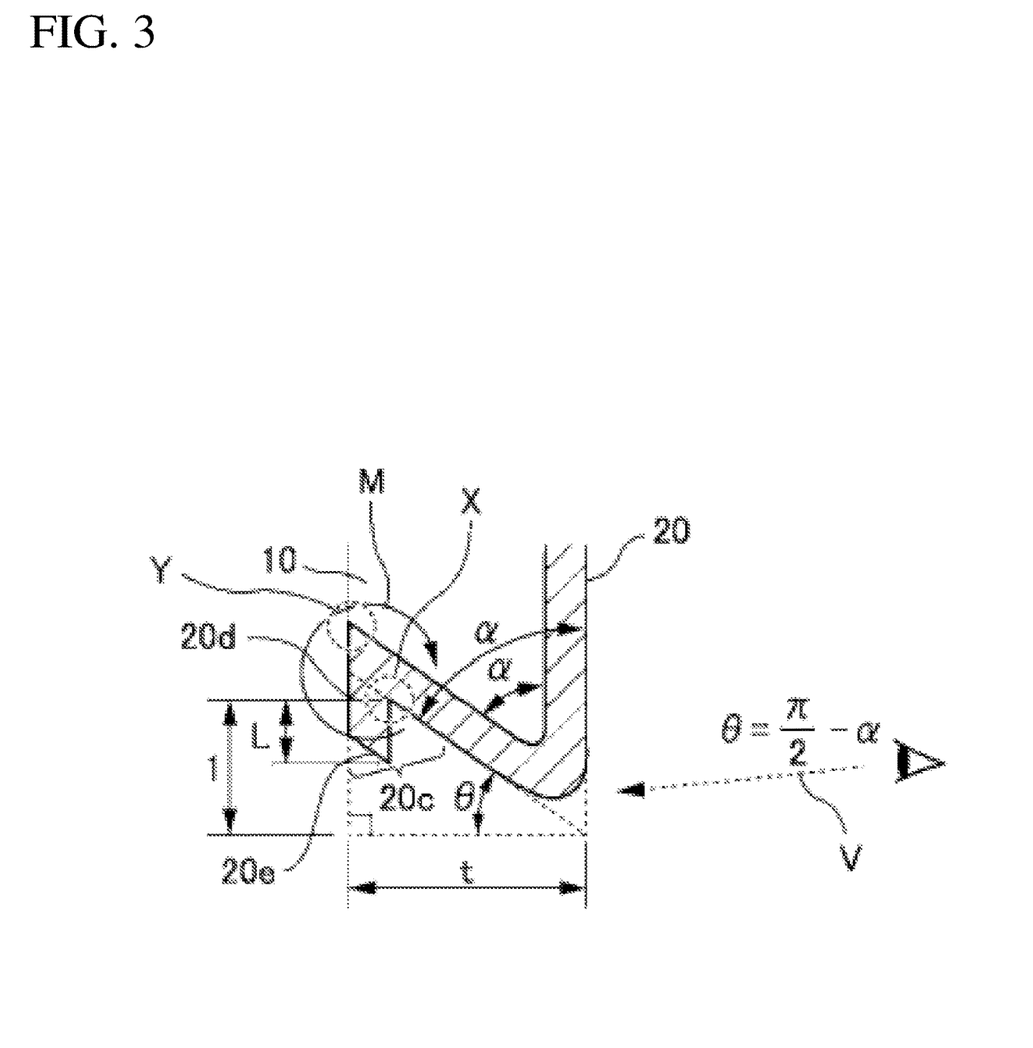
FIG. 3 is a detailed illustration of part B in FIG. 2.

Thus, as shown in FIG. 3, the automotive interior component 1 is formed with compression set at an inner part X where the end 20c of the skin material 20 is bent toward the end surface 20e and tensile set at an outer part Y, that is, in the state where Moment M of the end 20c of the skin material 20 bending toward the side surface 10s of the base member 10 remains. This cancels out the moment of the end 20c of the skin material 20 in the direction becoming separated from the side surface 10s of the base member 10 that occurs by contraction of the end 20c of the skin material 20 due to thermal effect in work or the like. Thus, the reverse side 20s of the skin material 20 becomes less prone to be separated from the side surface 10s of the base member 10 and, therefore, a well-kept appearance is expected to last.

While the detail will be given later, in cutting a redundant part J of the skin material 20 for forming the tab 20d, the operator is allowed to slide a cutter 54, which will be described later, along the side surface 10s of the base member 10 using the side surface 10s of the base member 10 as the guide. That is, this configuration facilitates the cutting.

Additionally, the length dimension L of the tab 20d is set in the tolerance in which the maximum value is 1 mm and the minimum value is 0 mm. That is, the required precision in the cutting for forming the tab 20d is not rigorous. This configuration facilitates the work.

Note that, when the length dimension L is 0 mm which is the minimum value of the tolerance, that is, when the tab 20d is not formed, similarly to the case where the length dimension L is a positive value, the end surface 20e of the skin material 20 is disposed along the side surface 10s of the base member 10, and the skin material 20 is formed in the state where moment M of the end 20c of the skin material 20 bending toward the side surface 10*s* of the base member 10 remains. Thus, the reverse side 20*s* of the skin material 20 becomes less prone to be separated from the side surface 10*s* of the base member 10, and a well-kept appearance is expected to last.

As shown in FIG. 3, whether the end surface 20*e* of the skin material 20 is caught by the line of sight V directed from the outside to the inside depends on the relationship among the length dmension L of the tab 20*d*, a thickness t of the automotive interior coponent 1, and an angle θ which is the complementary angle for the angle α:

$$\theta \geq \tan^{-1}(L/t)$$

For example, in order to render the end surface 20*e* less noticeable on the line of sight V when the length dimension L of the tab 20*d* is constant, a smaller thickness t requires a greater angle θ, and a greater thickness t permits a smaller angle θ.

Here, as the angle θ is the complementary angle for the angle α, the following relationship is established:

$$\theta = \pi/2 - \alpha (\pi: \text{Pi})$$

Accordingly, when the maximum value of the length dimension L of the tab 20*d* reaching the end surface 20*e* is 1 mm, the relationship between the thickness t of the automotive interior component 1 and the angle α (in radians) is expressed by the following relational expression:

$$\alpha \leq \pi/2 - \tan^{-1}(1/t)$$

The relational expression converted into degrees (in degrees) is as follows:

$$\alpha \leq 90 - (180/\pi) * \tan^{-1}(1/t)$$

For example, when the thickness of the base member 10 is 3 mm and the thickness of the skin material 20 is 2 mm, the thickness t of the automotive interior component 1 is 5 mm and the maximum value of the angle α is about 1.37 rad (about 78 degrees).

Thus, the maximum value of the angle α in the case where the thickness t of the door trim 1 is determined and the length dimension L of the tab 20*d* reaching the end surface 20*e* is the maximum value of 1 mm is obtained.

By the angle α being set to a value that satisfies the relational expression in accordance with the thickness t of the door trim 1, the tab 20*d* is hidden behind the skin material 20 abutted onto the door panel 100. This renders the end surface 20*e* of the tab 20*d* less noticeable and, therefore, a neat appearance is presented.

Second Embodiment

Next, with reference to the drawings, a detailed description will be given of a second mode for carrying out the present invention (hereinafter referred to as the second embodiment).

The automotive interior component 1 according to the second embodiment is different from the automotive interior component 1 according to the first embodiment in that: while the skin material 20 in the automotive interior component 1 according to the first embodiment includes the end 20*c* with the tab 20*d*, the skin material 20 in the automotive interior component 1 according to the second embodiment includes the end 20*c* without the tab 20*d*. In the following, those configurations common to the first and second embodiments may not be repetitively described.

Figure 4:
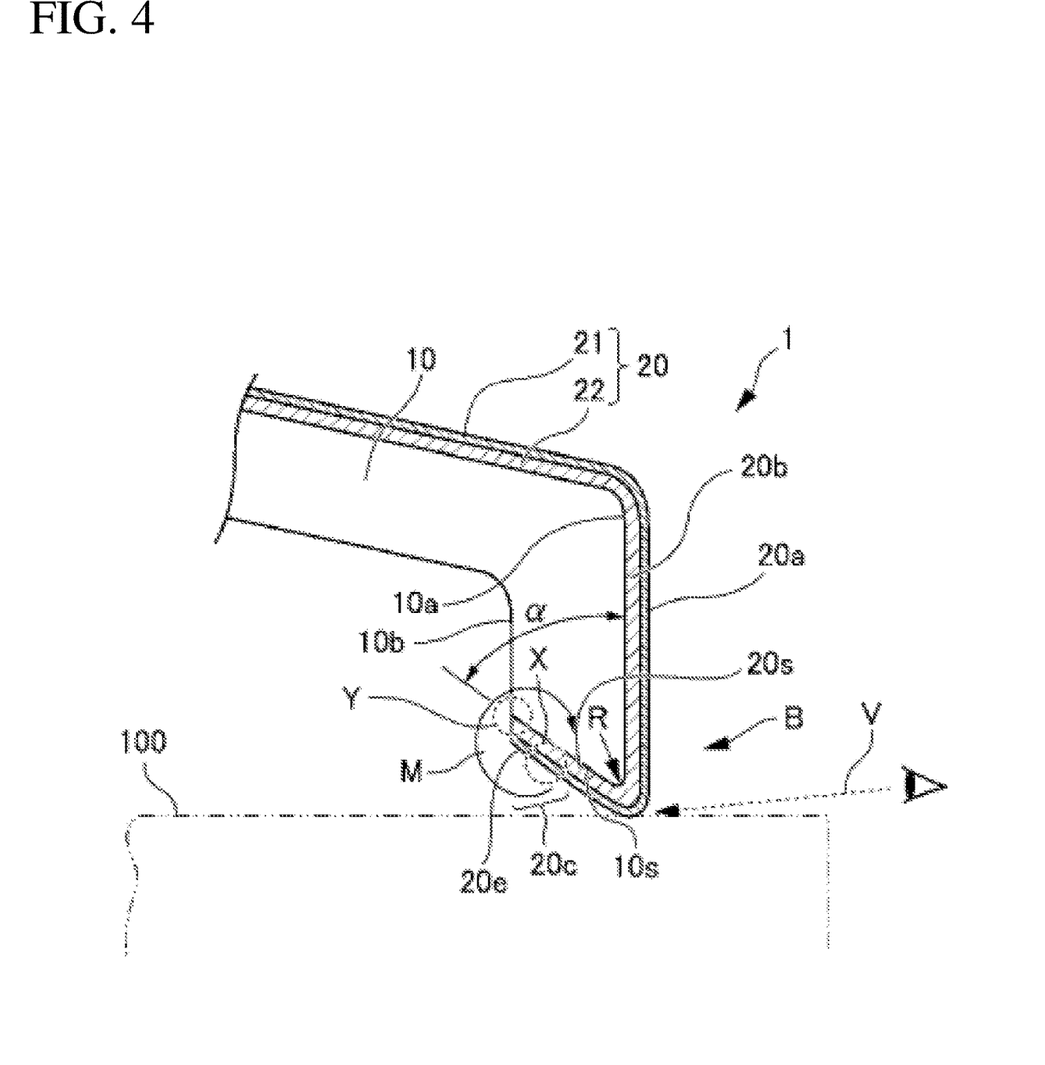
FIG. 4 is a detailed cross-sectional view on arrow A in FIG. 1 according to a second embodiment.
Figure 5A:
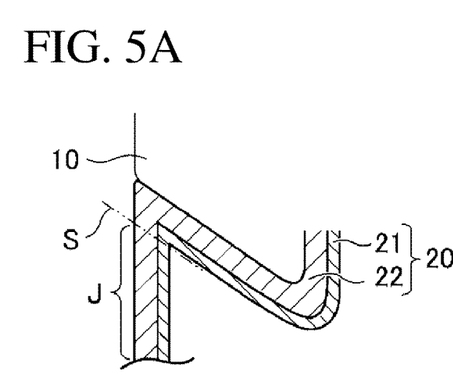
FIG. 5A is a detailed illustration of part B in FIG. 4 before cutting a redundant part J.
Figure 5B:
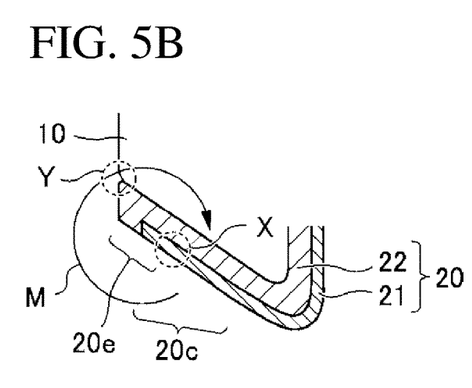
FIG. 5B is a detailed illustration of part B in FIG. 4 after cutting the redundant part J.

FIG. 4 is a detailed cross-sectional view on arrow A in FIG. 1. FIG. 5A is a detailed illustration of part B in FIG. 4 before cutting a redundant part. FIG. 5B is a detailed illustration of part B in FIG. 4 after cutting the redundant part.

As shown in FIG. 4, the skin material 20 is a lamination made up of an upper layer 21 and a lower layer 22. The skin material 20 is laminated on the base member 10 so as to cover the front surface 10*a* and the side surface 10*s* of the base member 10 from the front surface 10*a* to the side surface 10*s*.

The end 20*c* of the skin material 20 has a constant thickness along the side surface 10*s* of the base member 10. The end surface 20*e* of the skin material 20 is disposed along the side surface 10*s* of the base member 10.

In forming the end 20*c* of the skin material 20 of this configuration, for example, first, as shown in FIG. 5A, the base member 10 and the skin material 20 are integrally laminated leaving the redundant part J of the skin material 20. The skin material 20 is bent so that its cross section becomes Z-shaped. Thereafter, the skin material 20 is cut along a cutting plane S to separate the redundant part J.

Thus, the end surface 20*e* of the skin material 20 is directed toward the door panel 100 (in the bottom direction in FIG. 4) along the side surface 10*s* of the base member 10.

While FIG. 4 shows the end surface 20*e* of the skin material 20 set to be parallel to the side surface 10*s* of the base member 10, the required precision in forming the end surface 20*e* is not rigorous. The end surface 20*e* should just be directed toward the door panel 100.

The cutting may be carried out by any of ultrasound, water jet, laser, piercing and the like. As will be described later, the cutting may be carried out simultaneously with the insert molding using a cutter 54 provided at a slide member 5.

Thus, as shown in FIG. 4, the automotive interior component 1 is formed with compression set at the inner part X where the end 20*c* of the skin material 20 is bent toward the end surface 20*e* and tensile set at the outer part Y, that is, in the state where moment M of the end 20*c* of the skin material 20 bending toward the side surface 10*s* of the base member 10 remains. This cancels out the moment of the end 20*c* of the skin material 20 in the direction becoming separated from the side surface 10*s* of the base member 10 that occurs by contraction of the end 20*c* of the skin material 20 due to thermal effect in work or the like. Thus, the reverse side 20*s* of the skin material 20 becomes less prone to be separated from the side surface 10*s* of the base member 10 and, therefore, a well-kept appearance is expected to last.

In order to prevent the end surface 20*e* of the skin material 20 from being caught by the line of sight V directed from the outside to the inside, the front surface 10*a* of the base member 10 and the side surface 10*s* of the base member 10 should form an acute angle.

Thus, the side surface 10*s* of the base member 10 becomes continuous to the front surface 10*a* of the base member 10 while forming an acute angle of angle α therewith, and the end surface 20*e* of the skin material 20 extends along the side surface 10*s* of the base member 10. Therefore, despite the absence of the tab 20*d*, the end surface 20*e* which is a section of the skin material 20 is hidden behind the skin material 20 as seen on the line of sight V directed from the outside to the inside, whereby a neat appearance is presented. Furthermore, the automotive interior component 1 is formed in the state where moment M of the end 20*c* of the skin material 20 bending toward the side surface 10*s* of the base member 10 remains at the end 20*c* of the skin material 20. This cancels out the moment of the end 20*c* of the skin material 20 in the direction becoming separated from the side surface 10s of the base member 10 that occurs by contraction of the end 20c of the skin material 20. Hence, the reverse side 20s of the skin material 20 becomes less prone to be separated from the side surface 10s of the base member 10 and, therefore, a well-kept appearance is expected to last.

In the following, with reference to FIGS. 6 to 9, a description will be given of a method of manufacturing the automotive interior component 1.

Figure 6:
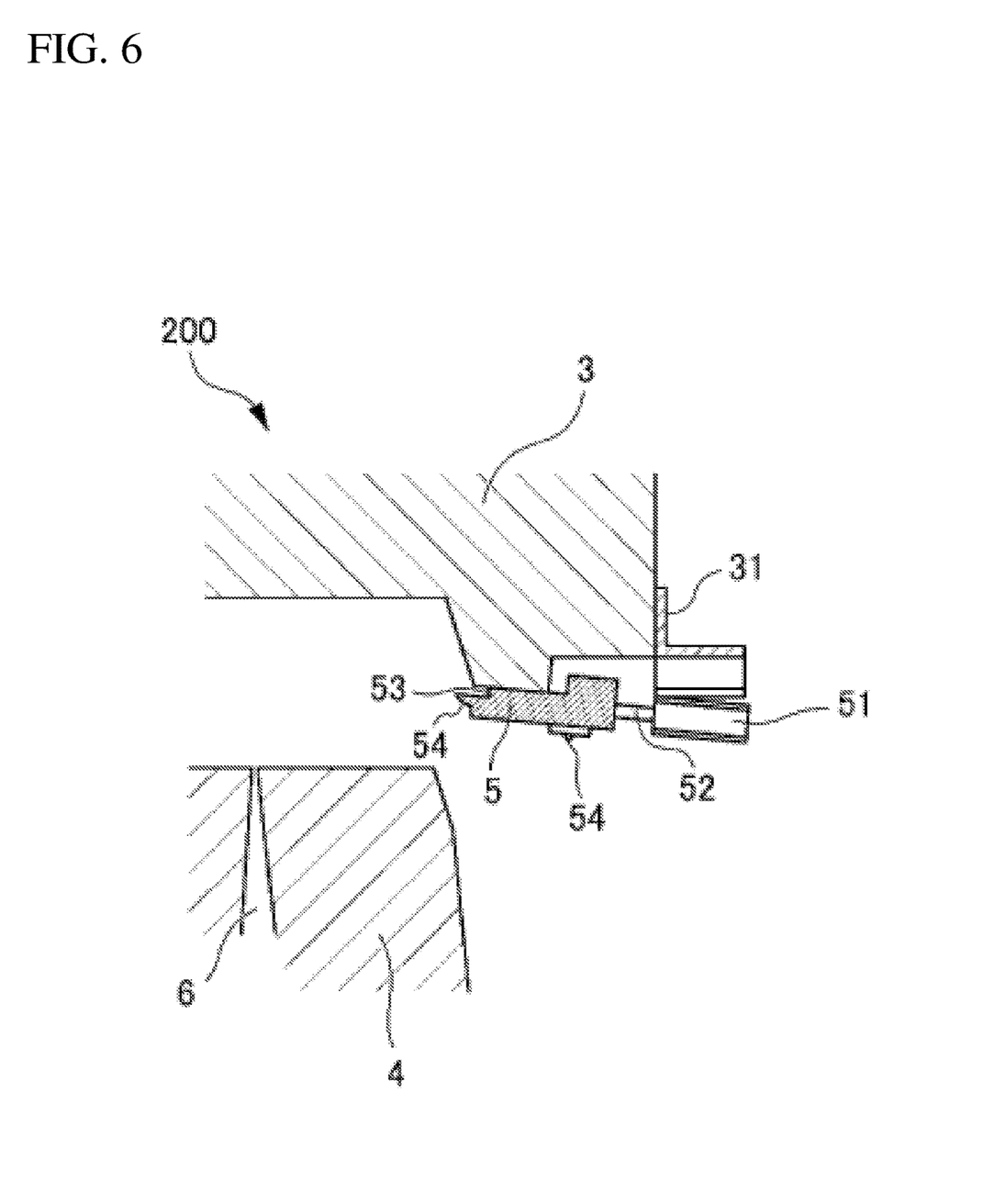
FIG. 6 is a schematic cross-sectional view of a mold device 200.
Figure 7:
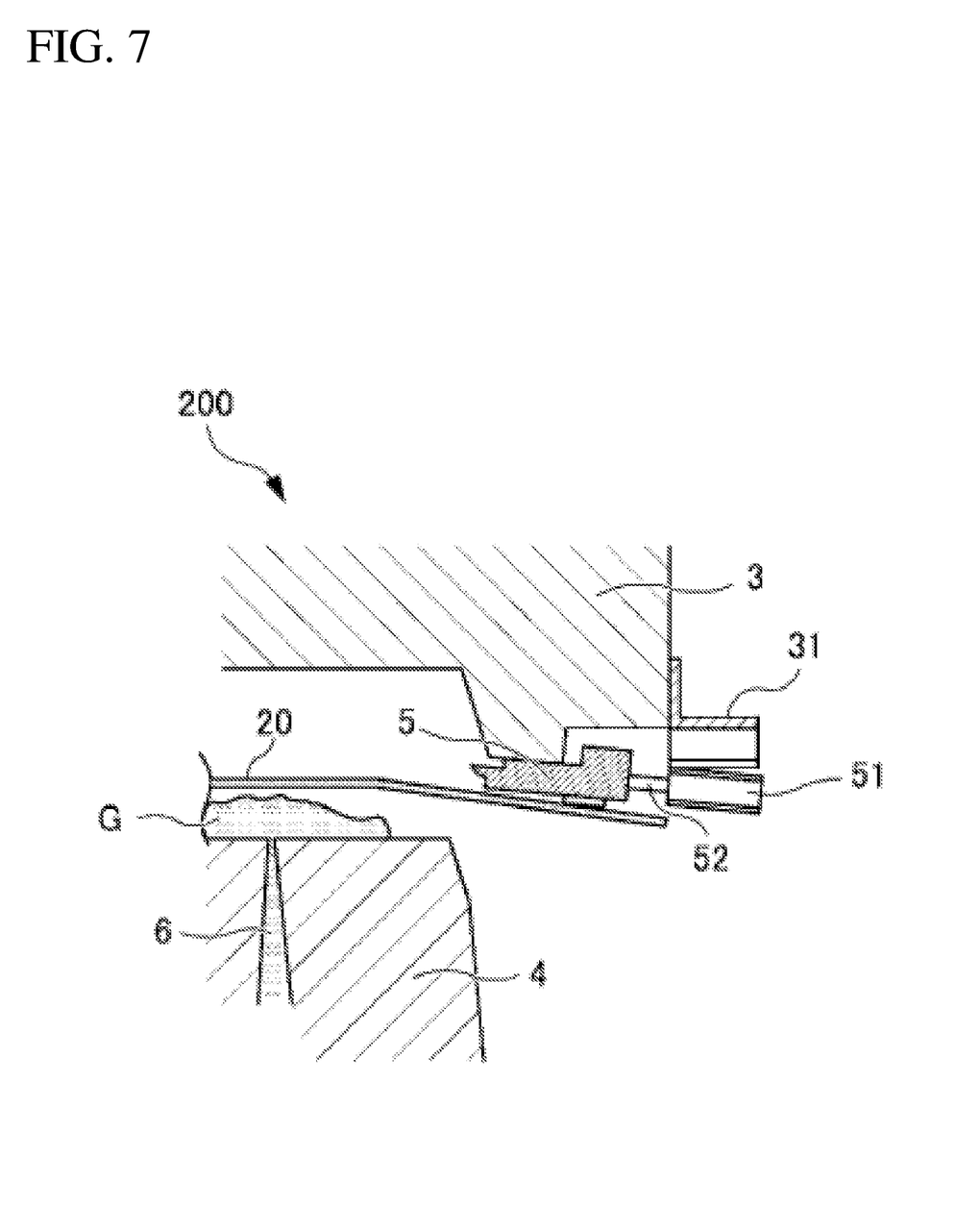
FIG. 7 is a schematic cross-sectional view showing a skin material 20 and a melted resin G to be a base member 10.
Figure 8:
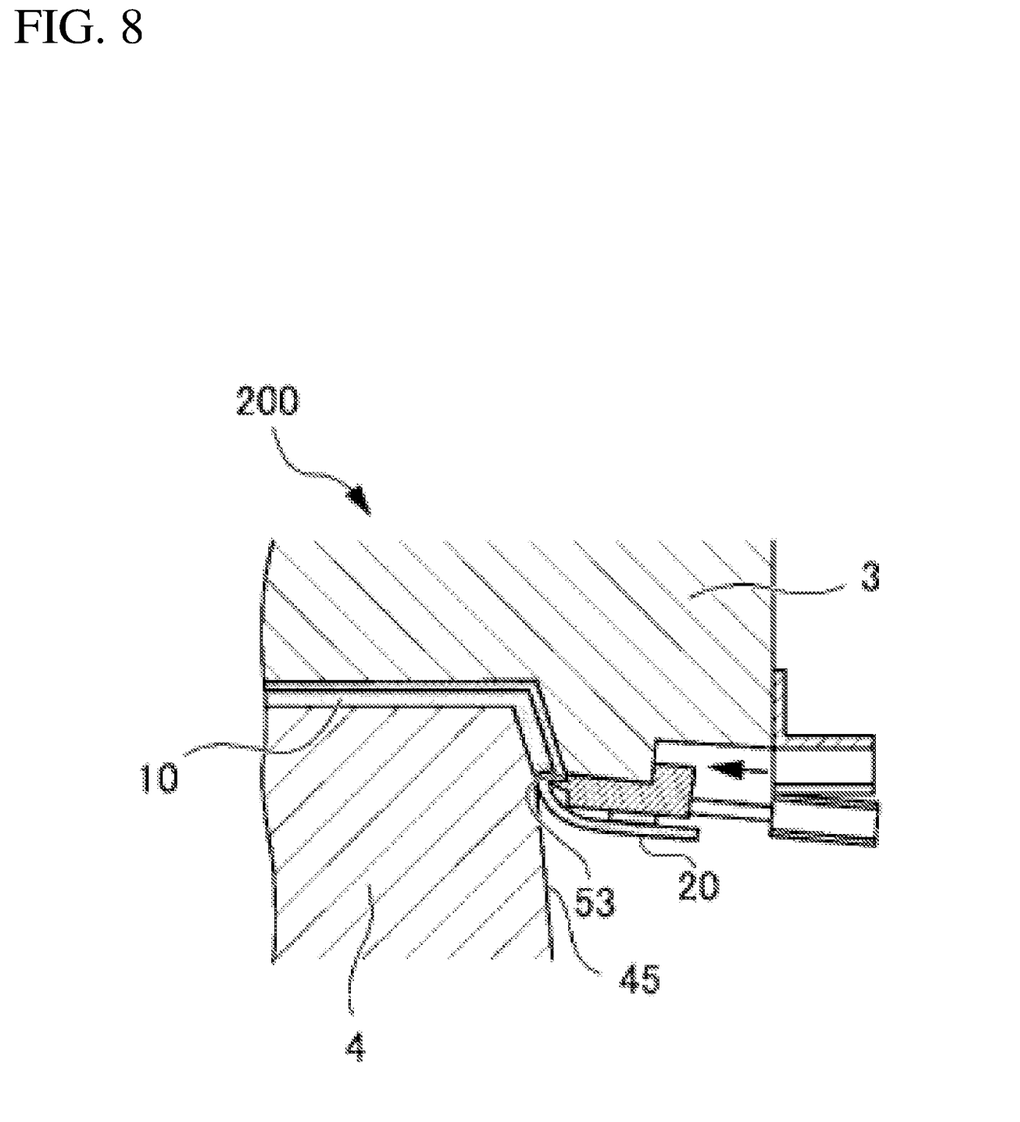
FIG. 8 is a schematic cross-sectional view showing an operation of a slide member 5.
Figure 9:
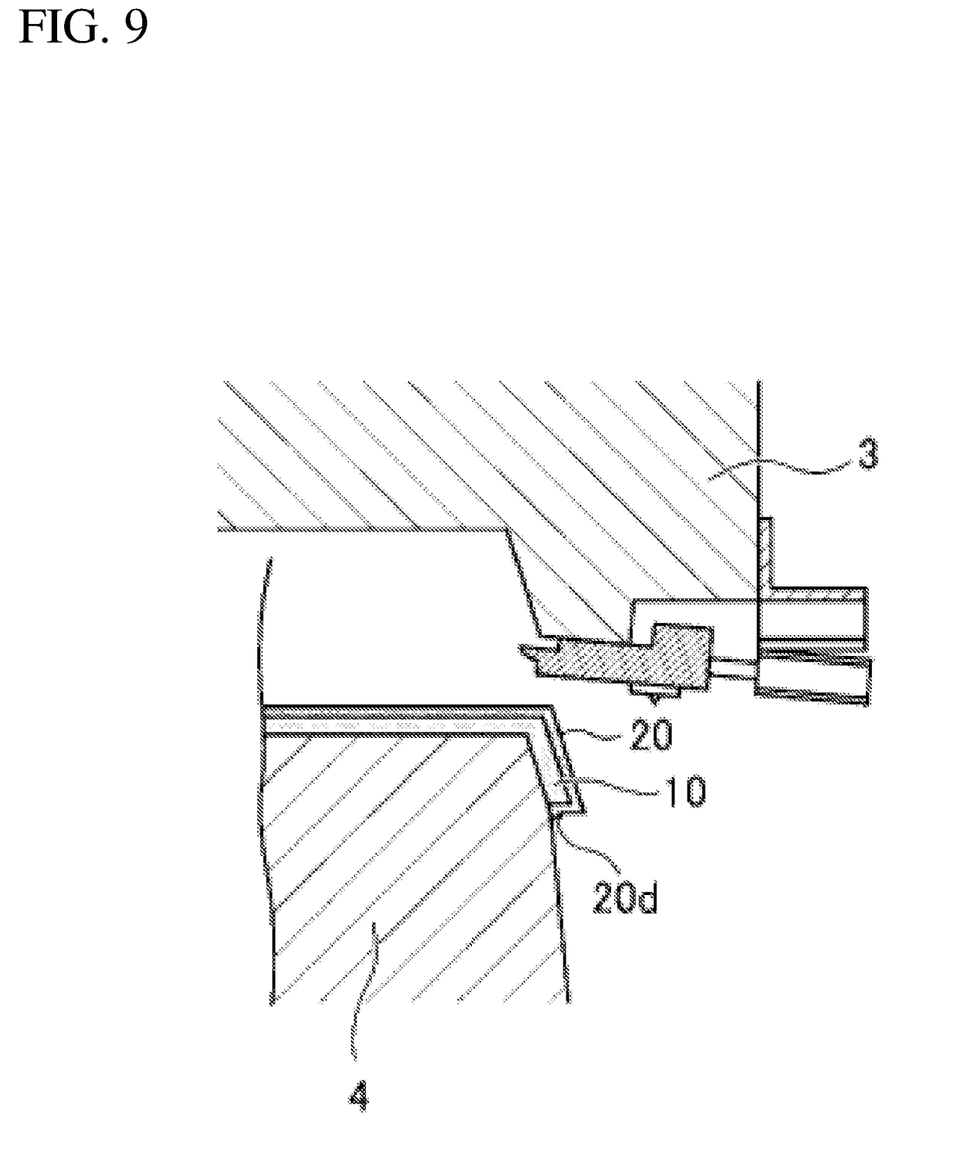
FIG. 9 is a schematic cross-sectional view showing the state of an automotive interior component 1 being removed from the mold.

FIG. 6 is a schematic cross-sectional view of a mold device 200 used in molding the automotive interior component 1. FIG. 7 is a schematic cross-sectional view showing the skin material 20 and melted resin G to be the base member 10. FIG. 8 is a schematic cross-sectional view showing an operation of the slide member 5. FIG. 9 is a schematic cross-sectional view showing the state of the automotive interior component 1 being removed from the mold.

As shown in FIG. 6, the automotive interior component 1 is molded using the mold device 200 which includes an upper mold 3, a lower mold 4, and a slide member 5 provided at the upper mold 3 for disposing of a redundant end of the skin material 20.

Specifically, the lower mold 4 is fixed onto a workbench which is not shown. The lower mold 4 is provided with a supply passage 6 for supplying the melted resin G which is the material of the base member 10. The supply passage 6 has its one end opened upward, and has it other end connected to an injection machine which is not shown.

The upper mold 3 disposed above the lower mold 4 is hoisted and lowered by a hoisting and lowering cylinder which is not shown. With the upper mold 3 set at the lowermost position, the skin material 20 and the melted resin G which is the material of the base member 10 are supplied to a clearance formed between the upper mold 3 and the lower mold 4. Thus, the automotive interior component 1 is molded by insert molding.

A bracket 31 is fixed to the outer surface of the upper mold 3. To the bracket 31, a cylinder 51 driven by air or the like is fixed.

To a tip of a piston rod 52 of the cylinder 51, the slide member 5 is attached. This slide member 5 is advanceable in an obliquely upward direction.

The slide member 5 is provided with a recess 53 at its tip. The recess 53 defines the shape of the side surface 10s of the base member 10, and is configured to tuck the skin material 20 from the front surface 10a to the side surface 10s of the base member 10 as the slide member 5 slides.

The slide member 5 is provided with a cutter 54 at its tip. By the cutter 54 pressed against the skin material 20 having the skin material 20 interposed between the lower mold 4 and the cutter 54, the skin material 20 is cut.

Using the above-described mold device 200, the automotive interior component 1 is manufactured as follows.

(1) First, with the upper mold 3 and the lower mold 4 being spaced apart from each other, the skin material 20 is disposed in the upper mold 3 (FIG. 7).

Here, the upper mold 3 is provided with a vacuum mechanism which is not shown. By the vacuum mechanism being actuated, the skin material 20 is molded by vacuum forming, and the skin material 20 is kept at the upper mold 3 by vacuum suction.

The upper mold 3 may be provided with grains for transferring the pattern onto the skin material 20.

A model having a shape similar to the core of the lower mold 4 may be temporarily disposed so as to oppose to the upper mold 3. Thus, the skin material 20 may be molded by pressure forming using the upper mold 3 and the model.

(2) Subsequently, the melted resin G, which is the material of the base member 10, is supplied to the clearance between the skin material 20 and the lower mold 4 (FIG. 7).

(3) The hoisting and lowering cylinder, which is not shown, is turned on to lower the upper mold 3 (FIG. 7).

Here, the slide member 5 is slid by the operation of the cylinder 51 in an obliquely upward direction relative to the plane perpendicular to the mold-removing direction at an angle falling within a range of 5 degrees to 45 degrees inclusive from the front surface 10a of the base member 10 to the side surface 10s so as to tuck the end 20c of the skin material 20. The slide member 5 is brought into contact closely with the side surface 4s of the lower mold 4 via the skin material 20.

In this manner, using the recess 53 of the slide member 5 as part of the mold, the base member 10 is molded and the base member 10 is formed on the skin material 20 by insert molding.

(4) Thereafter, after the supplying the melted resin G completes, the base member 10 and the skin material 20 are left for a predetermined time to be cooled in the state shown in FIG. 8. This facilitates the integration of the base member 10 and the skin material 20.

(5) After a lapse of the predetermined time, the slide member 5 is further slid toward the side surface 4s of the lower mold 4, to cut the skin material 20 set between the lower mold 4 and the cutter 54 at the tip of the slide member 5. Thus, the redundant part J is cut off, and the tab 20d is formed at the end 20c of the skin material 20 as shown in FIG. 9.

(6) The hoisting and lowering cylinder is turned on to hoist the upper mold 3 (FIG. 9), and the molded automotive interior component 1 is removed from the mold.

Through the foregoing procedure, the automotive interior component 1 in which the base member 10 and the skin material 20 are integrally molded is obtained.

As compared to a method including tucking and cutting after the removing the automotive interior component from the mold, the present method of manufacturing the automotive interior component achieves shortened work time, because the tucking the skin material at the periphery of the base member and the cutting the redundant end of the skin material are performed simultaneously with the insert molding.

The foregoing is the preferred embodiments of the present invention. The automotive interior component of the present invention is not limited to the embodiments, and various modifications and changes may be made within the spirit of the present invention recited in the claims.

In the present invention, an automotive interior component includes: a base member including a front surface, a back surface, and a side surface provided between the front surface and the back surface; and a skin material integrated with the base member. The skin material is integrated with the front surface and the side surface of the base member. The side surface of the base member is continuous to the front surface of the base member while forming an acute angle therewith. The end surface of the skin material extends along the side surface of the base member. Thus, the end surface which is a section of the skin material is hidden behind the skin material as seen in the direction from the front surface of the skin material toward the back surface of the skin material, whereby a neat appearance is presented. Furthermore, the automotive interior component is formed in the state where the moment of the end of the skin material bending toward the side surface of the base member remains at the end of the skin material. This cancels out the moment of the end of the skin material in the direction becoming separated from the side surface of the base member that occurs by contraction of the end of the skin material. Hence, the reverse side of the skin material becomes less prone to be separated from the side surface of the base member and, therefore, a well-kept appearance is expected to last.

In the present invention, the end of the skin material includes a tab bent from the side surface of the base member in a direction becoming separated from the side surface of the base member. This tab increases the stiffness of the end of the skin material, and a reverse side of the skin material becomes less prone to be separated from the side surface of the base member. Thus, a well-kept appearance is expected to last.

In the present invention, the tab has a dimension which allows the tab to be hidden behind the skin material without being caught by the line of sight from the outside to the inside relative to the automotive interior component. This renders the end surface of the tab which is a section of the skin material less noticeable and, therefore, a neat appearance is presented.

In the present invention, the thickness t of the automotive interior component and the angle α satisfy the following relational expression:

$$\alpha \leq \pi/2 - \tan^{-1}(1/t)$$

Thus, in the case where the thickness of the base member is changed by the design condition, the angle α is variable corresponding to the thickness of the base member. This allows the end surface of the tab which is a section of the skin material to be hidden behind the skin material and, accordingly, a neat appearance is presented.

In the present invention, a fillet having a radius falling within a range of 2 mm to 5 mm inclusive is provided between the front surface and the side surface of the base member. This prevents concentration of stress to the bent portion of the skin material when the skin material is bent while being in close contact with the base member along the front surface to the side surface of the base member. This minimizes the risk of breakage of the skin material. Thus, a well-kept appearance is expected to last.

As compared to an automotive interior component formed by tucking the skin material into the back surface of the base member thereby disposing of the redundant end, the present invention eliminates costs for an adhesive and labor that would be incurred in tucking and bonding the skin material into the back surface of the base member.

REFERENCE SIGNS LIST

1: door trim (automotive interior component)
3: upper mold
4: lower mold
4s: side surface
5: slide member
6: supply passage
10: base member
10a: front surface
10b: back surface
10s: side surface
20: skin material
20c: end
20d: tab
20e: end surface
20s: reverse side
21: upper layer
22: lower layer
31: bracket
51: cylinder
52: piston rod
53: recess
54: cutter
100: door panel
200: mold device
C: clearance
L: dimension
J: redundant part
S: cutting plane
G: melted resin
M: moment
V: line of sight
X: inner part
Y: outer part
α: angle
θ: angle

The invention claimed is:

1. An automotive interior component comprising:
a base member including a front surface, a back surface, and a side surface provided between the front surface and the back surface;
a skin material integrated with the base member; and
a fillet provided between the front surface and the side surface, the fillet having a radius falling within a range of 2 mm to 5 mm inclusive, wherein
the skin material is integrated with the front surface and the side surface,
the side surface of the base member is continuous to the front surface of the base member while forming an acute angle of angle α with the front surface of the base member, and
the skin material includes an end having an end surface extending along the side surface of the base member at a position corresponding to a boundary between the back surface and the side surface.

2. The automotive interior component according to claim 1, wherein a thickness t of the automotive interior component and the angle α satisfy a relational expression:

$$\alpha \leq \pi/2 - \tan^{-1}(1/t).$$

3. An automotive interior component comprising:
a base member including a front surface, a back surface, and a side surface provided between the front surface and the back surface; and
a skin material integrated with the base member, wherein
the skin material is integrated with the front surface and the side surface,
the side surface of the base member is continuous to the front surface of the base member while forming an acute angle of angle α with the front surface of the base member,
the skin material includes an end surface extending along the side surface of the base member, and
the skin material includes an end including a tab bent from the side surface of the base member in a direction becoming separated from the side surface of the base member.

4. The automotive interior component according to claim 3, wherein the tab has a dimension with which the tab is hidden behind the skin material without being caught by a line of sight directed from outside to inside relative to the automotive interior component.

5. The automotive interior component according to claim 4, wherein a thickness t of the automotive interior component and the angle α satisfy a relational expression:

$\alpha \leq \pi/2 - \tan^{-1}(1/t)$.

6. The automotive interior component according to claim 4, further comprising a fillet provided between the front surface and the side surface, the fillet having a radius falling within a range of 2 mm to 5 mm inclusive.

7. The automotive interior component according to claim 3, wherein a thickness t of the automotive interior component and the angle α satisfy a relational expression:

$\alpha \leq \pi/2 - \tan^{-1}(1/t)$.

8. The automotive interior component according to claim 3, further comprising a fillet provided between the front surface and the side surface, the fillet having a radius falling within a range of 2 mm to 5 mm inclusive.

\* \* \* \* \*